United States Patent [19]

Hamada

[11] Patent Number: 4,533,338
[45] Date of Patent: Aug. 6, 1985

[54] DAMPER DISC

[75] Inventor: Tooru Hamada, Takatsuki, Japan

[73] Assignee: Kabushiki Kaisha Daikin Seisakusho, Neyagawa, Japan

[21] Appl. No.: 541,641

[22] Filed: Oct. 13, 1983

[30] Foreign Application Priority Data

Oct. 13, 1982 [JP] Japan .................. 57-155394[U]

[51] Int. Cl.³ ..................... F16D 3/14; F16D 3/66
[52] U.S. Cl. .................... 464/64; 192/106.1; 192/106.2; 464/68
[58] Field of Search .................... 464/62–68, 464/81; 192/106.1, 106.2

[56] References Cited

U.S. PATENT DOCUMENTS

| 3,138,039 | 6/1964 | Zeidler et al. | 464/64 X |
| 3,948,373 | 4/1976 | Worner | 464/68 X |
| 4,044,874 | 8/1977 | Worner | 464/68 X |
| 4,101,015 | 7/1978 | Radke | 464/68 X |
| 4,177,888 | 12/1979 | Arrowsmith | 464/68 X |
| 4,188,806 | 2/1980 | Fall et al. | 464/64 |
| 4,360,352 | 11/1982 | Lamarche | 464/64 |
| 4,440,283 | 4/1984 | Nioloux | 464/68 X |

FOREIGN PATENT DOCUMENTS 1525291  4/1968  France .

Primary Examiner—John Petrakes
Attorney, Agent, or Firm—Armstrong, Nikaido, Marmelstein & Kubovcik

[57] ABSTRACT

The present invention discloses a damper disc comprising a hub adapted to be connected to an output shaft; a radial flange formed integrally with the hub; a pair of side plates having a torque input portion at the outer peripheral portion, and disposed at opposite sides of the hub flange; a pair of sub-plates disposed between the hub flange and the side plates; a sub-pin connecting the sub-plates together and passing through a circumferentially long recess in the hub flange radially outward from the hub, a circumferential space corresponding to a first torsion angle being formed between the sub-pin and the side edge of the recess; a first torsion spring mechanism having a low spring constant and operable to connect the sub-plates and the hub flange together at a torsion area below the first torsion angle; a second torsion spring mechanism having a large spring constant, connecting the side plate and sub-plates together and operable to connect the side plates and the hub flange together at a torsion area above the first torsion angle and a stop pin connecting the side plates together and passing through circumferential recesses in the sub-plates and the hub flange radially outwardly from the second torsion spring mechanism.

3 Claims, 5 Drawing Figures

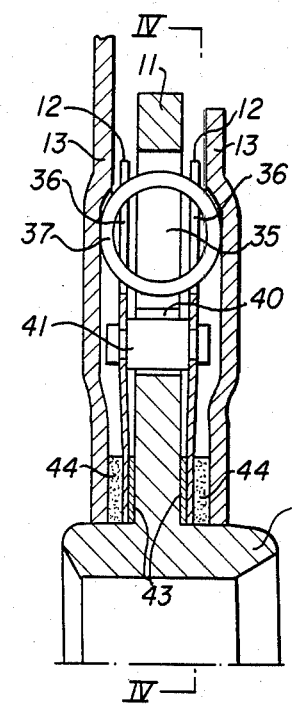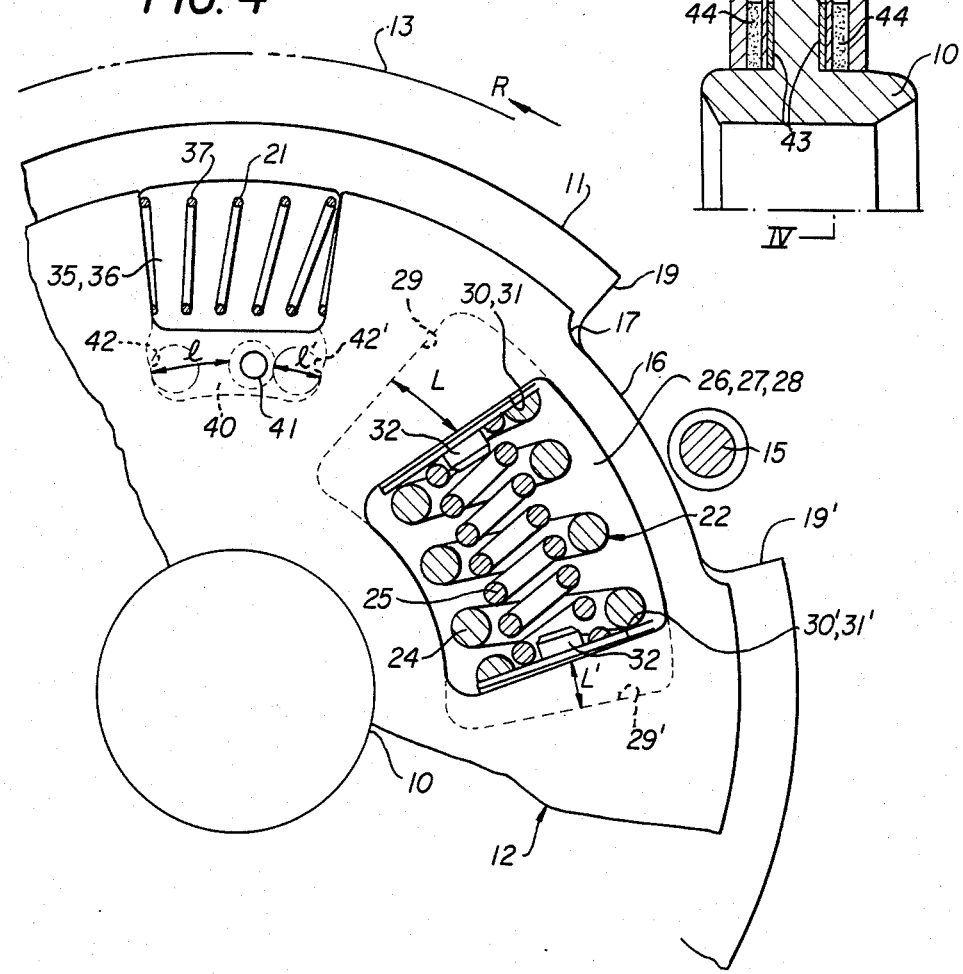

DAMPER DISC

BACKGROUND OF THE INVENTION

The present invention relates to a damper disc used as a clutch disc of automobiles, or the like.

A structure in FIG. 1 has already been proposed as a damper disc having a large torsion angle and stepped torsion characteristic. In FIG. 1, a spline hub 1 and an annular flange 2 there-around are separated from each other, and are adapted to be unrotatably connected by radial claws or teeth 3 and 4. A pair of sub-plates 5 are disposed at opposite sides of the flange 2. Although they are not shown, side plates which are a clutch plate and a retaining plate are disposed at opposite sides of the sub-plates 5. The sub-plates 5 are rigidly connected to the flange 2 by sub-pins 6, and are connected to the hub 1 through weak torsion springs 9. The flange 2 are connected to the side plates through strong torsion springs 8.

According to this structure, when a transmitted torque is small (section 0-a in FIG. 2), the weak springs 9 are compressed. After the transmitted torque and the torsion angle increase to values of Ta and $\theta a$ respectively, and the teeth 3 and 4 contact with each other, the springs 8 are compressed. Therefore, the transmitted torque-torsion angle characteristic is determined as shown in FIG. 2 and is stepped and has a large torsion angle, so that an absorbing effect for torque vibration is improved.

However, according to the above structure, noises may be generated when the teeth 3 and 4 collide with each other. Since the teeth 3 and 4 project radially from the outer periphery of the hub 1 and the inner periphery of the flange 2, respectively, the teeth 3 and 4 may break when they collide with each other. Especially, in such cases that a space S between the teeth 3 and 4 and/or openings for the springs 9 are determined long in order to increase the maximim torsion angle, the strength of the teeth 3 and 4 is remarkably reduced.

Accordingly, it is an object of the invention to provide an improved damper disc, overcoming the above-noted disadvantages.

The essence of the invention is to provide a radial flange formed integrally with a spline hub and a pair of subplates which are designed to torsionally turn or twist together with side plates with respect to the flange when a torsion angle is small.

Other and further objects, features and advantages of the invention will appear more fully from the following description of the preferred embodiments of the invention.

BRIEF DESCRIPTION OF THE DRAWINGS

FIG. 3 is a sectional partial view of a disc according to the invention;

FIG. 4 is a sectional partial view taken along line IV—IV in FIG. 3, with certain parts cut away.

DETAILED DESCRIPTION OF THE PREFERRED EMBODIMENTS

Figure 1:
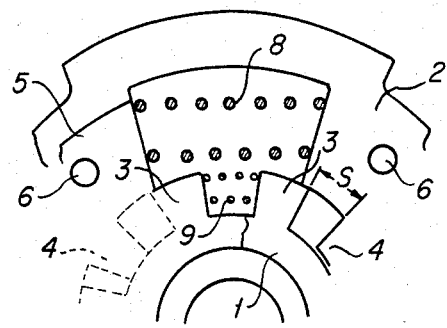
FIG. 1 is a schematic partial elevation view of a conventional disc, with certain parts cut-away.
Figure 2:
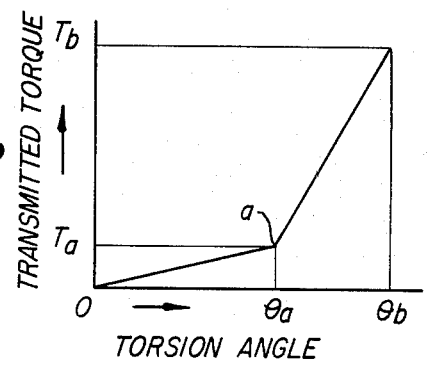
FIG. 2 is a graph showning a transmitted torque-torsion angle characteristic of the conventional disc.

Referring to FIG. 3, a spline hub 10 adapted to be splined to an output shaft (not shown) integrally has a radially outward hub flange 11. A pair of annular side plates 13 are disposed at opposite sides of the flange 11 with sub-plates 12 therebetween respectively. The left side plate 13 in FIG. 3 is a clutch plate. Although they are not illustrated, cushioning plates are fixed to the outer peripheral portion of the left side plate 13, and friction facings are fixed to the both faces of the cushioning plates. Respectively three portions of the outer peripheral portions of the side plates 13 are connected together by stop pins 15 shown in FIG. 4. The flange 11 and the sub-plates 12 are respectively provided at the outer peripheries with circumferentially long recesses 16 and 17 through which the stop pins 15 pass. In a non-torsion condition shown in FIG. 4, there are spaces in a disc rotation direction R and the reverse direction between each stop pin 15 and side edges 19 and 19' of each recess 16 in the flange 11.

Figure 5:
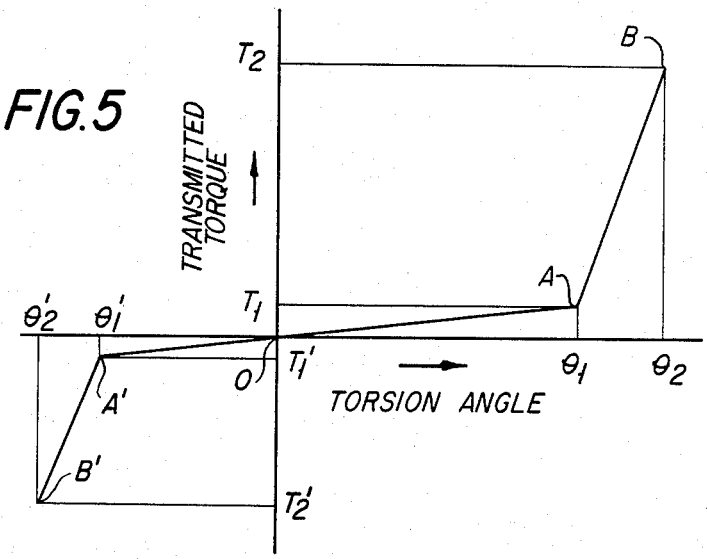
FIG. 5 is a graph showing a transmitted torque-torsion angle characteristic of the disc according to the invention.

The disc of the illustrated embodiment is provided with three torsion spring mechanisms 22, which are disposed at equal distances around hub 10 and radially inside the stop pins 15 with respect to the radial direction of the disc. Each spring mechanism 22 is provided with coaxially arranged compressible coil springs 24 and 25 of respectively large and small diameters, which extend substantially in the circumferential direction of the disc and are disposed in openings 26, 27 and 28 of the sub-plates 12 and the side plates 13. In the illustrated non-torsion condition, both ends of the springs 24 and 25 are pressed through spring seats 32 to side-edges 30 and 31 of the openings 27 and 28 in the sub-plates 12 and the side plates 13, and are apart from side edges 29 and 29' of the openings 26 in the flange 11 with spaces L and L' respectively corresponding to first torsion angles $\theta_1$ and $\theta'_1$, which will be detailed later. The springs 24 and 25 are fitted in the openings 27 and 28 in pre-compressed condition. The pre-compressed force of the spring 24 and 25 are determined, as described later, in consideration of first torques $T_1$ and $T'_1$ in FIG. 5 corresponding to the first torsion angles $\theta_1$ and $\theta'_1$.

Referring to FIG. 4, torsion spring mechanisms 21 are disposed between torsion spring mechanisms 22. Each spring mechanism 21 is provided with one compressible coil spring 37 which is fitted in openings 35 and 36 (or recesses) formed at the radially outer portions of the flange 11 and the sub-plates 12. In the illustrated non-torsion condition, both ends of each spring 37 are in contact with the side edges of the openings 35 and 36. The springs 37 are softer than the springs 24 and 25, and are assembled in the openings 35 and 36 without pre-compression. As shown in FIG. 3, the side plates 13 are not provided with openings for the springs 37, and prevent the springs 37 from moving in the axial direction of the disc.

As shown in FIG. 4, each opening 35 of the flange 11 is extended beyond the openings 36 of the sub-plates 12 toward the center of the disc. The above extended portions of the openings 35 form recesses 40 in flange 11 through which sub-pins 41 pass. As shown in FIG. 3, the sub-pins 41 rigidly connect both sub-plates 12 together. As shown in FIG. 4, there are spaces l, l' respectively corresponding to said first torsion angle $\theta_1$, $\theta'_1$ between each sub-pin 41 and both side edges 42 and 42' of each recess 40.

Referring to FIG. 3, a wave spring 43 is arranged in a compressed condition between the radially inner portion of the flange 11 and each sub-plate 12. An annular friction washer 44 is arranged between th radially inner portion of each sub-plate 12 and each side plate 13.

One of the specific functions or operations of the disc can be as follows. When the friction facing is pressed to a flywheel of an engine (not shown), a torque is transmitted to the side plates 13. While the torsion angle of the side plate 13 with respect to the flange 11 is below the predetermined value of $\theta_1(\theta'_1$ in FIG. 5), the spring seats 32 do not contact with the side edges 29 and 29' of the openings in the flange 11. Therefore, the torque is transmitted from the side plates 13 through the springs 24 and 25, sub-plates 12 and the springs 37 to the flange 11, and then through the hub 10 to the output shaft. In this operation, the sum of the pre-compression force of the spring 24 and 25 and the friction forces of the friction washers 44 in FIG. 3 substantially corresponds with the first torque $T_1$ ($T'_1$) at the first torsion angle $\theta_1(\theta'_1)$, so that the springs 24 and 25 are not substantially compressed and only the springs 37 are compressed. Consequently, the side plates 13 and the sub-plates 12 are united and twist or torsionally turn with respect to the flange 11, and the torsion angle rapidly increases in accordance with the increase of the transmitted torque (O-T, O-T'). Further, in this operation, since sliding occurs on the surfaces of the wave springs 43, a small hysteresis torque (not shown) by said sliding is added to the torsion characteristic (sections O-A and O-A') in FIG. 5.

When the torsion angle and the torque increase to the predetermined value $\theta_1$ and $T_1(\theta'_1$ and $T'_1)$, the sub-pins 41 contact with the side edges 42 or 42' of the recesses of the flange 11. Therefore, the sub-plates 12 are prevented from further torsion with respect to the flange 11, and the springs 37 are also prevented from further compression. After the above contact of the pins 41, the side plates 13 torsionally turn with respect to the flange 11 and the sub-plates 12. When the torsion angle increases to the above value of $\theta_1(\theta'_1)$, the spring seats 32 contact with the side edges 29 (or 29') of the openings in the flange 11. And thereafter, the torque is transmitted from the side plates 13 through the springs 24 and 25 to the flange 11, and the springs 24 and 25 are compressed. Consequently, as apparent from sections A-B (A'-B') in FIG. 5, the increasing rate of the torsion angle with respect to the torque increase becomes small. During this operation, sliding occurs on the surfaces of the friction washers 44 in FIG. 3, so that a large hysteresis torque (not shown) corresponding to the sliding is added to the sections A-B (A'-B') of the torsion characteristic in FIG. 5.

When the torsion angle increases to a maximum value of $\theta_2$(or $\theta'_2$), the stop pins 15 in FIG. 4 contact with the side edges 19 (or 19') of the recesses in the flange 11, so that any further torsion is prevented.

According to the invention, as stated hereinbefore, a pair of the side plates 13 having torque input portions at the radially outer portions are disposed at both sides of the flange 11 formed integrally with the hub 10 with the sub-plates 12 therebetween. The sub-pins 41 connecting the sub-plates 12 together are passed through the circumferentially long recesses 40 in the hub flange 11. In the non-torsion condition, there are spaces l, l' corresponding to the first torsion angles $\theta_1$, $\theta'_1$ between the sub-pins 41 and the side edges 42 and 42' of the recesses. In the torsion area below the first torsion angle, the sub-plates 12 and the hub flange 11 are connected together by the torsion spring mechanisms 21 having a small spring constant. The side plates 13 and the flange 11 are connected in the torsion area over the first torsion angle ($\theta_1$, $\theta'_1$) by the torsion spring mechanisms 22.

As detailed above, the flange 11 is integrally formed with the hub 10, and is adapted to be connected to the sub-plates 12 by means of the sub-pins 41 and the recesses 40 at the first torsion angles of $\theta_1$ and $\theta'_1$. Therefore, in comparison with the conventional structure having the teeth 3 and 4 in FIG. 1, the connecting portions can have large strength and the durability can be increased. Since the openings 26, 35 and others can be circumferentially long without losing a practical strength, the springs 24, 25 and 37 which are longer than the conventional ones can be used to determine the maximum torsion angles ($\theta_2$, $\theta'_2$) large, so that the absorbing effect for the torque vibration can be improved. Further, the impact shock between the sub-pins 41 and the side edges of the recesses 40 is lightened by a slight elastic deformation of the sub-plates 12 and others, so that the impact noises may be reduced.

In a modification of the invention, the recesses 40 may be formed separately from the openings 35. The numbers of the springs and/or the other members may be changed.

Although the invention has been described in its preferred form with a certain degree of particularity, it is understood that the present disclosure of the preferred form may be changed in the details of construction and the combination and arrangement of parts may be resorted to without departing from the spirit and scope of the invention as hereinafter claimed.

What is claimed is:

1. A damper disc comprising a hub adapted to be connected to an output shaft; a radial hub flange formed integrally with the hub; a pair of side plates having a torque input portion at the outer peripheral portion and disposed at the opposite sides of the hub flange; a pair of sub-plates disposed between the hub flange and the side plates; a sub-pin connecting the sub-plates together and passing through a circumferentially long recess in the hub flange radially outward from the hub, a circumferential space corresponding to a first torsion angle being formed between the sub-pin and the side edge of the recess; a first torsion spring mechanism radially outward from said sub-pin and having a low spring constant and operable to connect the sub-plates and the hub flange together at a torsion area below the first torsion angle; a second torsion spring mechanism having a large spring constant, connecting the side plates and the sub-plates together and operable to connect the side plates and the hub flange together at a torsion angle above the first torsion angle; and a stop pin connecting the side plates together and passing through recesses in said sub-plates and said hub flange radially outwardly from said second torsion spring mechanism.

2. A damper disc of claim 1 wherein the recess in the flange for the sub-pin continues to the inner periphery of the opening for the first torsion spring mechanism.

3. A damper disc of claim 1 wherein the first torsion spring mechanism is disposed between said pair of side plates.

* * * * *